US008857689B2

(12) United States Patent
Levi (10) Patent No.: US 8,857,689 B2
(45) Date of Patent: Oct. 14, 2014

(54) ARTICULATED LADDER RACK FOR SEMI TRACTOR (76) Inventor: Avraham Y. Levi, Eagan, MN (US)

(*) Notice: Subject to any disclaimer, the term of this patent is extended or adjusted under 35 U.S.C. 154(b) by 434 days.

(21) Appl. No.: 13/368,635

(22) Filed: Feb. 8, 2012

(65) Prior Publication Data
US 2013/0202395 A1  Aug. 8, 2013

(51) Int. Cl.
B60R 9/00 (2006.01)
E06C 5/00 (2006.01)

(52) U.S. Cl.
USPC .............. 224/509; 224/497; 414/462

(58) Field of Classification Search
CPC ...... B60R 9/04; B60R 9/045; B60R 2011/04; B60R 9/06
USPC ......... 224/309, 321, 545, 495, 497, 502, 509, 224/543; 414/462; 182/180.3, 107, 194, 182/127, 97, 96, 95, 93
See application file for complete search history.

(56) References Cited

U.S. PATENT DOCUMENTS

| 2,035,537 | A | * | 3/1936 | Benning et al. | 182/39 |
| 3,365,023 | A | * | 1/1968 | Nagle | 182/211 |
| 3,411,607 | A | * | 11/1968 | Otten | 182/76 |
| 4,021,071 | A | * | 5/1977 | Norman | 296/62 |
| 4,492,286 | A | * | 1/1985 | Lemire | 182/93 |
| 4,579,198 | A | * | 4/1986 | Lee | 182/115 |
| 5,046,582 | A | * | 9/1991 | Albrecht | 182/127 |
| 6,012,545 | A | * | 1/2000 | Faleide | 182/97 |
| 6,622,822 | B1 | * | 9/2003 | Langhoff et al. | 182/90 |
| 6,772,928 | B2 | * | 8/2004 | Ford et al. | 224/497 |
| 7,080,713 | B1 | * | 7/2006 | Riggs | 182/127 |
| 7,992,682 | B2 | * | 8/2011 | Ziaylek | 182/127 |
| 8,136,632 | B2 | * | 3/2012 | Gabriel | 182/116 |
| 2005/0196258 | A1 | * | 9/2005 | Stabs | 414/462 |
| 2005/0236228 | A1 | * | 10/2005 | Thibault | 182/127 |
| 2010/0012433 | A1 | * | 1/2010 | Ross et al. | 182/211 |
| 2010/0089698 | A1 | * | 4/2010 | Brodsack | 182/127 |

FOREIGN PATENT DOCUMENTS

JP          09-183339 A       7/1997

* cited by examiner

Primary Examiner — Justin Larson
Assistant Examiner — Lester L Vanterpool
(74) Attorney, Agent, or Firm — Nikolai & Mersereau, P.A.; Thomas J. Nikolai (57) ABSTRACT There is provided an apparatus for storing a ladder on the outer rear wall of a cab of a semi tractor. It comprises an outer stationary frame that is bolted to the rear surface of the tractor cab proximate one side of the cab and contained within the outer frame are first and second panels that are pivotally joined to one another where one of the first and second panels is also pivotally joined to the stationary frame. The second inner panel carries a ladder support bracket. When stowed, a latch mechanism prevents the inner articulated frame panels from extending relative to the stationary outer frame. Upon unlatching, the two inner articulated panels can be rotated such that the ladder will be positioned to the side of the tractor cab and accessible to an individual standing on the ground.

11 Claims, 7 Drawing Sheets

ARTICULATED LADDER RACK FOR SEMI TRACTOR

BACKGROUND OF THE INVENTION

I. Field of the Invention

This invention relates generally to apparatus for storing a step ladder or extension ladder on the cab of a semi tractor, and more particularly to a ladder holder that when actuated, it delivers a stored ladder to a location accessible to a person standing on the ground alongside of the semi tractor.

II. Discussion of the Prior Art

Semi tractor and trailers carry lighting that periodically needs servicing. When it is considered that the overall height of a semi tractor and trailer is approximately 13 ft. 6 in. so as to comply with interstate highway bridge standards, it becomes necessary for the operator to have a ladder available in order to be able to reach lights atop the cab or trailer.

The fuel efficiency of semi-trucks is influenced tremendously by aerodynamics. Most of the power generated by a semi tractor is utilized to overcome drag forces while operating at highway speeds. Aerodynamic fairings have therefore become standard equipment on modern tractors.

The gap between the tractor cab and its trailer is a high drag region that is typically streamlined by providing tractor side panels as fairings that attach at the rear end of the cab along the sides thereof. Such side panels help prevent the air from entering the area between the cab and semi-trailer, thus substantially reducing the drag coefficient. It has been found that providing tractor side panels can yield a fuel saving of 0.7% for an articulated vehicle.

These tractor side panels must not interfere with the semi-trailer turning. To minimize the gap, rubber strips can be fitted onto the trailing edges of the tractor side panels, thus extending them and reducing the gap to the maximum extent while still not interfering with the turning ratio of the trailer.

Figure 1:
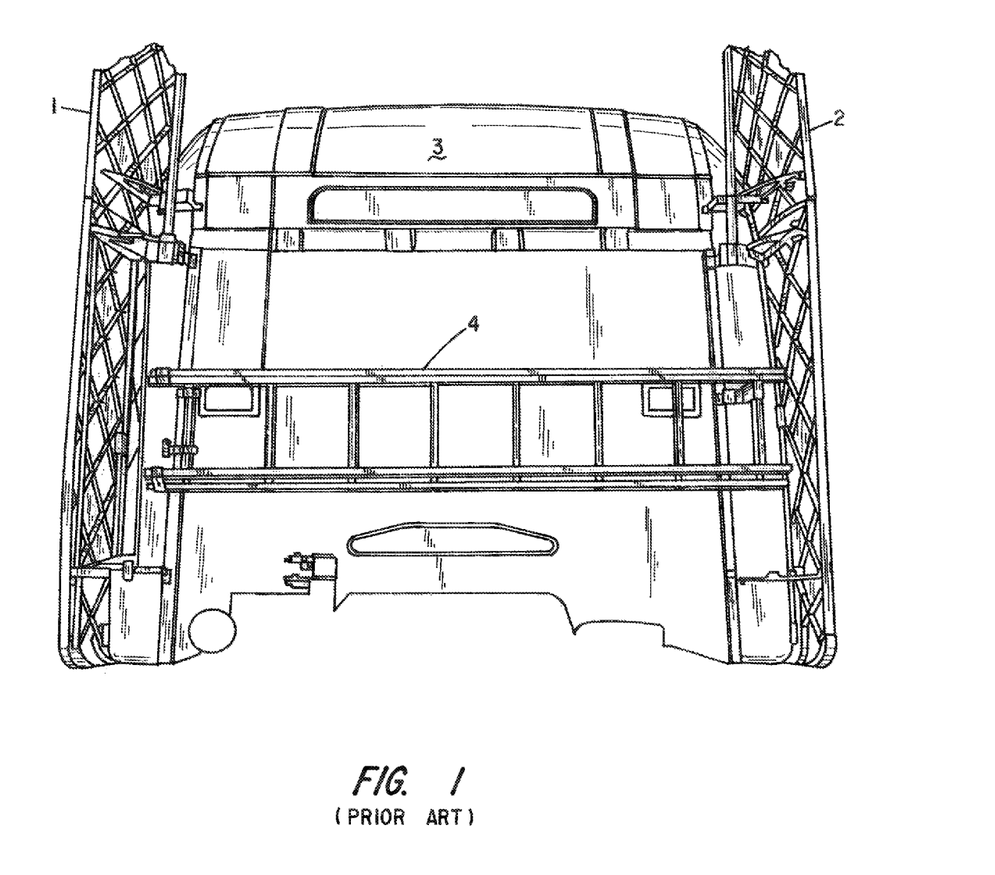
FIG. 1 is a rear view of a semi tractor cab showing a prior art ladder mounting arrangement thereon.

FIG. 1 is a rear view of a semi tractor cab showing side panels 1 and 2 on the rear driver's side and rear passenger's side of the cab 3. Also shown is a prior art ladder holder being used to support an extension ladder 4 against the rear surface of the cab 3.

Figure 2:
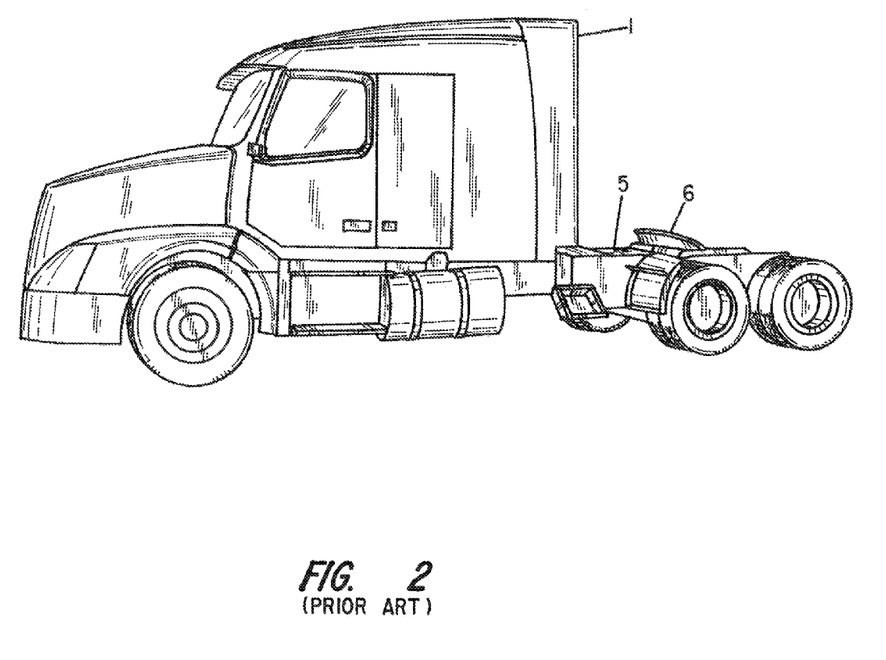
FIG. 2 is a side elevation view of a typical semi tractor incorporating side fairings.

It should be apparent from this view that in order for a person to access the ladder, that person must climb up upon the tractor's platform 5 (FIG. 2) to which the vehicle's two rear drive axles are journaled at a location just forward of its fifth wheel coupler 6. This area is often slippery due to accumulated grease and road dust, creating a hazard for the person seeking to remove or replace a ladder onto the rack on which it is normally stowed.

It would therefore be advantageous to have a ladder holder attachable to the rear surface of a semi tractor cab and that will make the ladder readily accessible to a person standing on the ground alongside the cab, thereby obviating the need to climb up onto the tractor platform 5 in order to gain access to the ladder. The present invention provides such a ladder holder.

SUMMARY OF THE INVENTION

The present invention provides a ladder mount for a semi truck that comprises an outer rectangular frame adapted for attachment to a rear surface of a tractor cab and having an articulated inner frame comprising a first frame panel pivotally hinged to the outer rectangular frame along a first vertical axis and a second frame panel pivotally hinged to the first frame panel along a second vertical axis where the second frame panel incorporates a support bracket adapted to engage a rung of an extension ladder or a step ladder. The outer rectangular frame is fastened to the rear surface of the tractor cab at a location such that when the inner articulated frame is unlatched with respect to the outer rectangular frame and the panels comprising the inner frame are pivoted about the first and second vertical axes, the second frame panel carrying the ladder will extend laterally out beyond the rear edge of the truck's side fairings.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Figure 3:
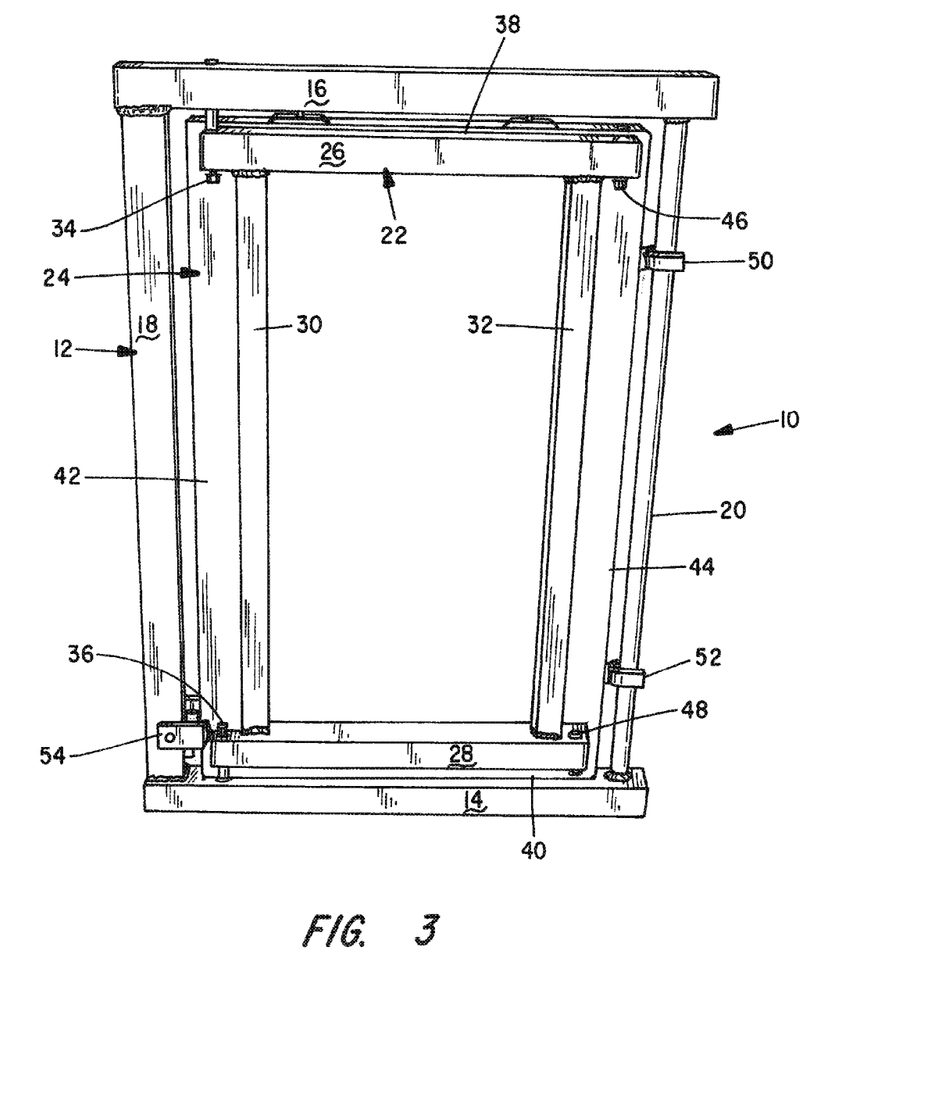
FIG. 3 is a rear view of a ladder holder constructed in accordance with the present invention.

Referring first to FIG. 3, there is shown a rear view of the ladder holder of the present invention. It is indicated generally by numeral 10 and is seen to comprise an outer rectangular frame 12 having a welded construction of a bottom frame member 14, a top frame member 16 and left and right side members 18, 20, defining a generally rectangular opening. The frame members 14, 16 and 18 may comprise rectangular metal tubes, preferably made of aluminum while the right frame member 20 comprises a tube of circular cross-section.

Without limitation, the top and bottom frame members 14, 16 may be approximately 24-30 in. in length while the side frame members 18, 20 may be approximately 30-36 in. in length.

Fitted within the rectangular opening of the outer rectangular frame member 12 and pivotally hinged thereto is an articulated inner frame assembly 21 having a first frame panel 22 which, in FIG. 3, is shown as being nested within a second frame panel 24.

The first frame panel 22 is seen to comprise a welded configuration having parallel, spaced-apart upper and lower horizontal frame members 26, 28 with perpendicular extending side frame members 30 and 32. Again, the first frame panel 22 may incorporate extruded aluminum tubes of rectangular cross-section and a length of the frame members 26, 28 may typically be about 18-24 in. The numbers 30, 32 may have a length of about 27-30 in.

As can be seen in FIG. 3, the upper frame member 26 of the first articulated inner panel 22 is pivotally hinged by bolts 34, 36 to the outer rectangular frame 12 and more particularly to the bottom frame member 14 thereby and the top frame member 16 thereof.

In the view of FIG. 3, the first frame panel 22 is shown as being nested within the confines of the second frame panel 24. The second inner articulated frame panel 24 comprises a welded assembly of upper and lower angle bars 38, 40 and left and right side panel 42 and 44, respectively. The angle bars comprising the second articulated frame member 24 are sized such that the frame members 26, 28, 30 and 32 of the first articulated frame panel 22 fit within the confines of the second frame panel 24.

Also seen in FIG. 3 and identified by reference numerals 46 and 48 are hinge pins that join the second frame panel 24 to the first frame panel 22.

Welded or otherwise attached to the second frame panel 24 are U-shaped brackets 50 and 52 that are adapted to straddle the right side frame member 20 of circular cross-section of the outer rectangular frame 12 when the first and second inner articulated frame panels are nested with respect to one another and releasably latched by a latch device 54 that is operatively disposed between the left side frame member 18 of the outer rectangular frame 12 and the left angle bar of frame member 42 of the second inner articulated frame panel 24.

Figure 5:
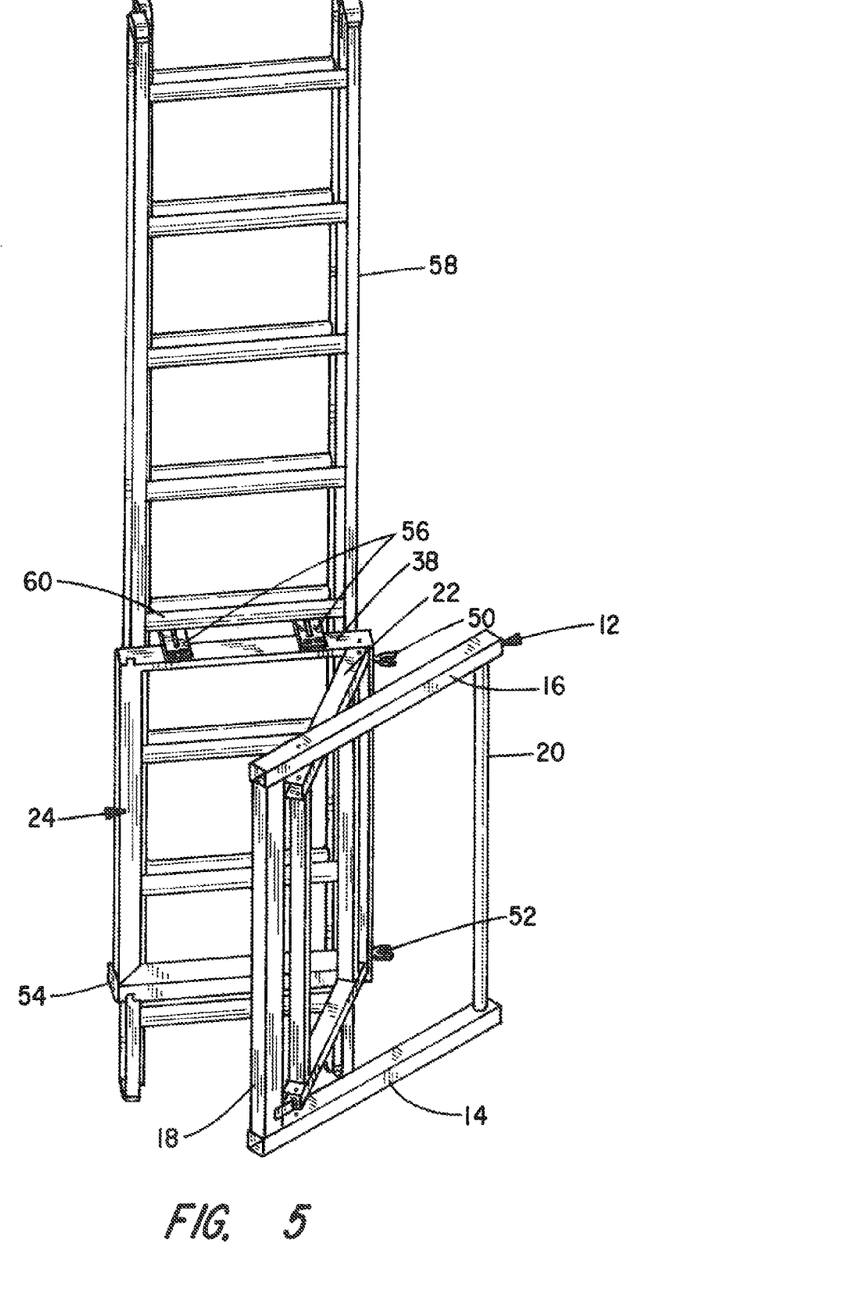
FIG. 5 is a perspective view illustrating the ladder holder of the present invention in a partially deployed configuration.

Not visible in the view of FIG. 3, but seen in the view of FIG. 5, are a pair of generally L-shaped ladder support brackets 56 that are bolted or otherwise affixed to the upper angle bar frame member 38 of the second frame panel 24. A ladder 58 is shown having its rung 60 supported by the L-shaped brackets 56.

Figure 4:
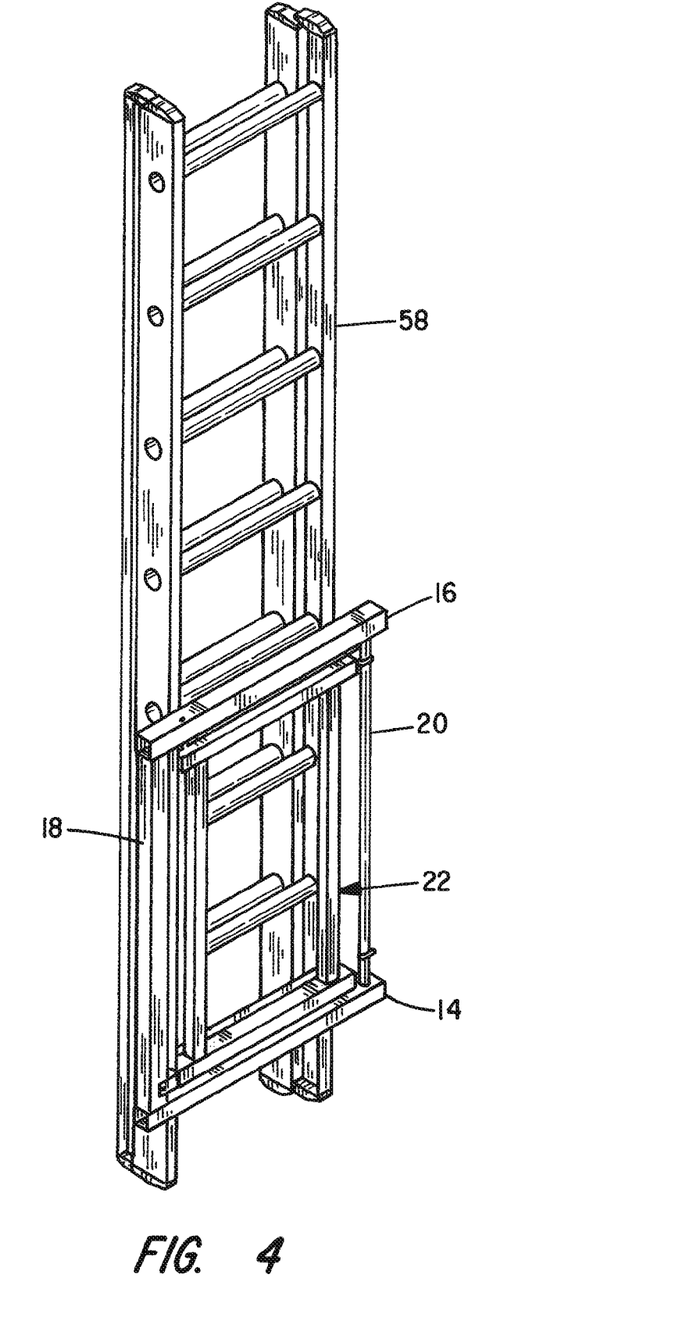
FIG. 4 is a perspective view of the ladder holder of FIG. 3 on which an extension ladder is mounted.

Turning next to FIG. 4, it should be imagined that the bottom and top frame members 14 and 16 of the outer rectangular frame 12 are bolted to the back surface of the cab 3 just laterally inward from the side fairing 2 in the view of FIG. 1.

Referring again to FIG. 5, here it is shown that the ladder 58 is supported by L-shaped brackets 56 secured to the second frame panel 24 which are now shown as being unlatched from the outer rectangular frame 12 such that the U-shaped brackets 50 and 52 are no longer engaging the right side frame member 20 of circular cross-section of the outer rectangular frame. The ladder is being swung away from its fixed mounting position as the first frame panel 22 is made to pivot about hinge pins 34 and 36 (FIG. 3) while the second frame panel 24 pivots about its hinge pins 46 and 48.

Figure 6:
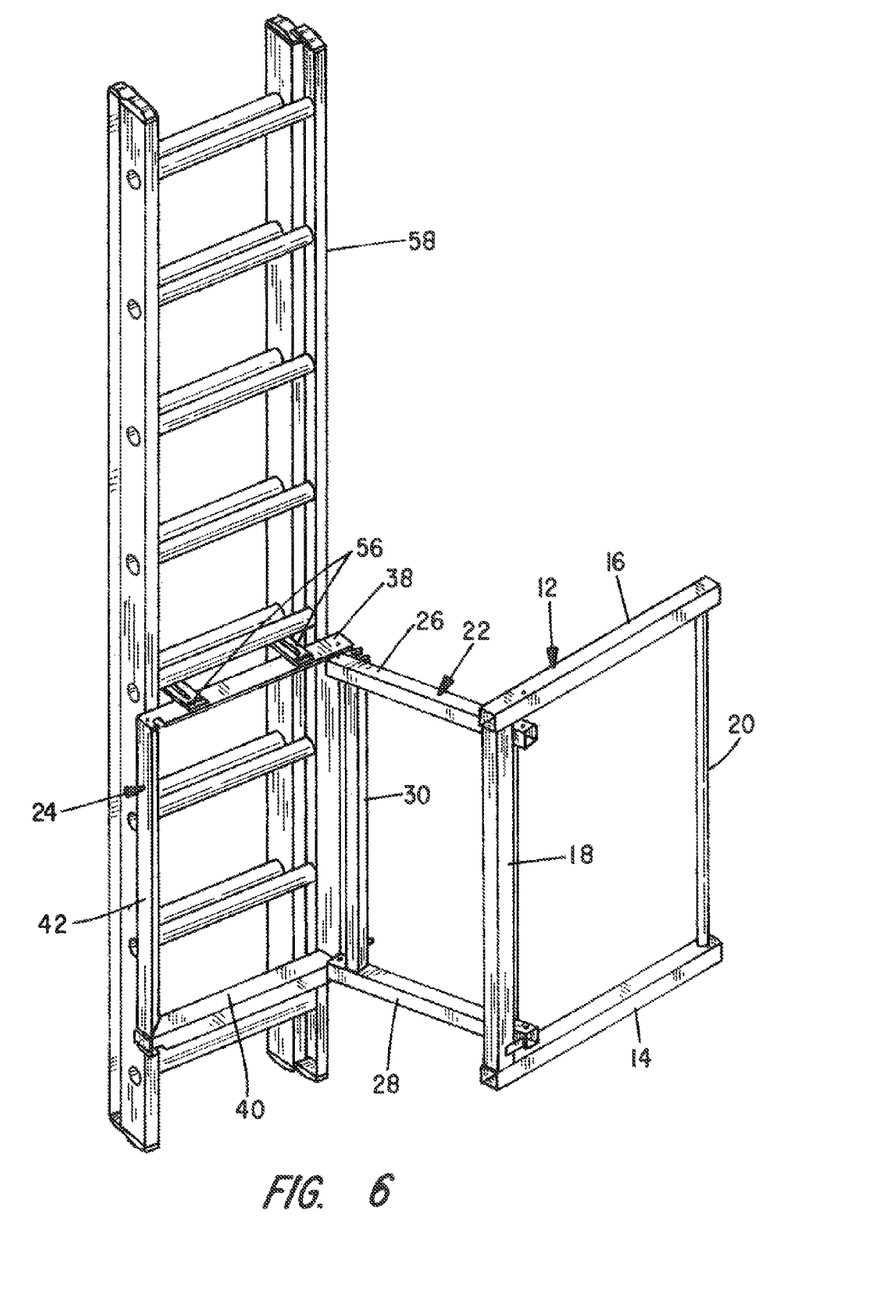
FIG. 6 is a perspective view showing the ladder holder of the present invention in its fully deployed configuration.

FIG. 6 illustrates the ladder 58 in its fully deployed position ready to be lifted free of the brackets 56 by a person standing on the ground. Again, it is to be recognized that the outer frame 12 remains bolted to the rear surface of the vehicle cab and that the first frame panel 22 spans the width dimension of the vehicle's side fairing 2 and with the second frame panel 24 extending laterally and generally perpendicularly from the side fairing and therefore fully accessible by a person standing on the ground who now need only lift the ladder from the brackets 56 and move it to a desired work location.

It will be appreciated that returning the ladder to its stowed disposition merely involves again placing a rung of the ladder on the brackets 56 while the articulated mount is in the disposition shown in FIG. 6 and then swinging the first and second panels 22 and 24 in a clockwise direction when view in FIG. 6 until the first frame panel 22 becomes nested within the second frame panel 24 and the two articulated panels are disposed within the opening defined by the members 14, 16, 18, 20 comprising the outer frame 12. As the assembly is being closed, the user will insure that the U-shaped brackets 50 and 52 again engage the right circular frame member 20 and when the panels are fully nested, the latch 54 will operate to hold the ladder mount in its closed disposition with the ladder 58 closely abutting the rear panel of the truck cab. A bungee cord may be used to strap a lower ladder ring to the bottom frame member 14.

Figure 7:
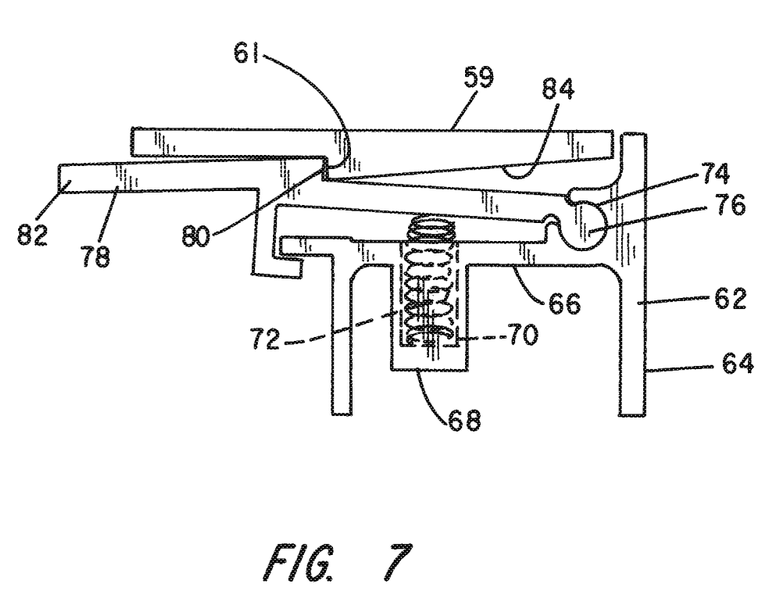
FIG. 7 is a detailed drawing showing the latch mechanism used with the present invention.

Those skilled in the art will appreciate that various latch mechanisms can be employed. The one illustrated in FIG. 7 is especially designed as a low-cost latch mechanism fabricated entirely from extruded aluminum so that the members thereof may simply be cut from a length of an extrusion. It is seen to comprise a stationary latch plate 59 that in use becomes affixed to the second frame panel 24 proximate a lower end of a vertical one of the four angle bars 38, 40, 42 and 44. The stationary plate 59 includes a shoulder 61. The latch assembly further includes an extruded latch mounting plate 62 having a flat surface 64 that in use is affixed to a side frame member of the outer rectangular frame 12. It also includes a horizontally extending, integrally formed arm 66 and a downwardly extending block 68 having a bore 70 formed therein for containing a spring 72.

Formed horizontally in the latch mounting plate 62 is an arcuate slot 74 for receiving therein a rounded hub 76 of the spring-loaded latch member 78. The spring-loaded latch member 78 is also seen to include a shoulder 80 which is adapted to engage the shoulder 61 of the stationary latch plate 59. Only when the spring-loaded latch member 78 is pushed downward when viewed in FIG. 7 against the force of the spring 72 can the shoulder 80 clear the shoulder 61 to release the latch and allow the articulated inner panels to swing out in the manner previously described.

When returning the inner articulated first and second panels to their nested position within the outer frame member 12, the spring-loaded latch member's extension 82 will ride along the sloped cam surface 84 of the stationary plate 59 until the shoulder 80 snaps against the shoulder 61 under the influence of the coil spring 72. This latch mechanism can readily be reached by a person standing on the ground and reaching his/her arm around the aerodynamic side fairing 2 seen in FIG. 1.

It can be seen that the present invention provides a safe and effective mechanism for transporting and deploying a ladder carried on a rear surface of the cab of a semi tractor.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A ladder mount for a semi truck comprising:
   (a) an outer rectangular frame adapted for attachment to a rear surface of a tractor cab;
   (b) an inner articulated frame assembly having a first frame panel pivotally hinged to the outer rectangular frame along a first vertical axis and a second frame panel pivotally hinged to the first frame panel along a second vertical axis; and
   (c) at least one ladder support bracket joined to the second frame panel and adapted to engage a rung of an extension or step ladder.

2. The ladder mount as in claim 1 wherein the outer rectangular frame comprises a bottom frame member and a top frame member held in parallel, spaced-apart relation by first and second, spaced-apart side frame members.

3. The ladder mount as in claim 2 wherein the bottom, top and at least one side frame members comprise tubing of rectangular cross section.

4. The ladder mount as in claim 3 wherein one of the side frame members has a circular cross-section.

5. The ladder mount as in claim 4 and further including a pair of U-shaped brackets affixed to the second frame panel of the inner articulated frame assembly, said U-shaped brackets adapted to engage the one of the side members of circular cross section when the inner articulated frame assembly is folded to fit within the outer rectangular frame.

6. The ladder mount as in claim 1 wherein the second frame panel comprises four angle bars welded together to form a rectangular configuration that is pivotable about the second vertical axis to contain the first frame panel within the rectangular configuration of the second frame panel.

7. The ladder mount as in claim 6 and further including a manually operated latch device operatively disposed between the second frame panel and the outer rectangular frame for releasably securing the first and second frame panels within an opening defined by the outer rectangular frame.

8. The ladder mount as in claim 5 and further including a manually operated latch device operatively disposed between the second frame panel and the outer rectangular frame for releasably securing the first and second frame panels within an opening defined by the outer rectangular frame when the U-shaped brackets are in engagement with the one side member of circular cross-section.

9. The ladder mount as in claim 8 wherein the semi truck includes aerodynamic side fairings affixed to the cab at rear side edges thereof and the outer rectangular frame is fastened to the rear surface of the tractor cab at a location such that when the first and second frame panels of the inner articulated frame assembly are released and pivoted about the first and second vertical axes, the second frame panel extends laterally out beyond a rear edge of the side fairings.

10. The ladder mount as in claim 7 wherein the latch device comprises:
    (a) a stationary plate affixed to the second frame panel proximate a lower end of a vertical one of the four angle bars, the stationary plate defining a shoulder;
    (b) a latch mounting plate affixed to a side frame member of the outer rectangular frame; and
    (c) a spring-loaded latch member pivotally mounted in the latch mounting plate, the latch member having a shoulder adapted to releasably mate with the shoulder of the stationary plate.

11. The ladder mount as in claim 10 wherein the stationary plate, the latch mounting plate and the spring-loaded latch member are extruded metal parts.

* * * * *